US008914411B1

(12) United States Patent
Mumford et al.

(10) Patent No.: US 8,914,411 B1
(45) Date of Patent: Dec. 16, 2014

(54) METHOD, SYSTEM AND COMPUTER PROGRAM PRODUCT FOR CONTROLLING DATA ACCESS THROUGH QUESTION AND ANSWER MECHANISM

(75) Inventors: Gregory Lee Mumford, Marion, IA (US); Bruce Albert Gross, Toddville, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 704 days.

(21) Appl. No.: 10/041,563

(22) Filed: Jan. 10, 2002

(51) Int. Cl.
*G06F 17/30* (2006.01)

(52) U.S. Cl.
USPC .......................................................... 707/783

(58) Field of Classification Search
USPC ....... 113/202; 705/2, 3, 10; 713/202; 379/88; 707/783, 104.1, 9, 1, 2, 104; 380/266
See application file for complete search history.

(56) References Cited

U.S. PATENT DOCUMENTS

| | | | | |
|---|---|---|---|---|
| 5,436,972 A * | 7/1995 | Fischer | ......................... | 380/286 |
| 5,907,597 A * | 5/1999 | Mark | ......................... | 379/93.03 |
| 6,026,491 A * | 2/2000 | Hiles | ............................. | 713/202 |
| 6,073,106 A * | 6/2000 | Rozen et al. | ....................... | 705/3 |
| 6,282,658 B2 * | 8/2001 | French et al. | ................. | 713/201 |
| 6,542,583 B1 * | 4/2003 | Taylor | ........................ | 379/88.02 |
| 6,845,448 B1 * | 1/2005 | Chaganti et al. | .............. | 713/166 |
| 7,043,464 B2 * | 5/2006 | Abrahams | ........................ | 706/14 |
| 7,237,117 B2 * | 6/2007 | Weiss | ............................. | 713/182 |
| 2002/0152265 A1 * | 10/2002 | Felman | ........................ | 709/203 |
| 2002/0165759 A1 * | 11/2002 | Gruber et al. | .................... | 705/10 |
| 2003/0028498 A1 * | 2/2003 | Hayes-Roth | .................... | 706/17 |

OTHER PUBLICATIONS

Bunnell et al., "Cognitive, associative, and conventional passwords: Recall and guessing rates", Computers &Security, © 1997, vol. 16, No. 7, pp. 629-641.*
Zviran et al., "User Authentication by Cognitive Passwords: An Empirical Assessment", Proceedings from the fifth Jerusalem conference on Information technology, IEEE Computer Society Press, © 1990, pp. 137-144.*

* cited by examiner

*Primary Examiner* — Alexey Shmatov

(57) ABSTRACT

A method, system and computer program product for controlling data access through a question and answer mechanism, including assigning a unique user identification for a user; associating information of the user with the user identification; receiving a request for the information based on the user identification; generating a question, based on a relationship between the user and a requestor of the information, that the requestor of the information must answer in order to access the information; and providing access to one of a portion of the information and all of the information, based on the relationship between the user and the requestor of the information, if the requestor correctly answers the question.

29 Claims, 17 Drawing Sheets

METHOD, SYSTEM AND COMPUTER PROGRAM PRODUCT FOR CONTROLLING DATA ACCESS THROUGH QUESTION AND ANSWER MECHANISM

BACKGROUND OF THE INVENTION

1. Field of the Invention

The present invention relates to controlling access to data and more particularly to a method, system and computer program product for controlling data access through a question and answer mechanism. The present invention includes use of various technologies described in the references identified in the appended LIST OF REFERENCES and cross-referenced throughout the specification by numerals in brackets corresponding to the respective references, the entire contents of all of which are incorporated herein by reference.

2. Discussion of the Background

In recent years, technology has enabled everyone to be more accessible. However, everyone wants his or her information to be kept private. Today, you must remember and/or track dozens of identifications (ID's), passwords, numbers, addresses, etc. You are also faced with the problem of notifying your contacts when such items of information change. For example, if you get a new phone number, you must inform all of your friends, family and business contacts of the change in your phone number. There is also the problem of limiting access to your personal information to the people and/or systems that you want to see your personal information. Many services, such as instant messaging (IM) [1], provide a means to enter your personal information. However, such services do not provide for a way to control access to your personal information.

For example, you can have a unique IM screen name or ID, but you are not required to provide your personal information in a corresponding profile. In fact, most people do not enter profile information because they are concerned with privacy. As a result, it is nearly impossible to look up a person's IM screen name or ID unless it is given to you in advance of contacting such a person.

Another service, ENUM [2], also allow a user to publish or not publish the user's personal information. The ENUM solution, however, is limiting in that it does not allow the user to set up their own account and it does not let the user choose the user's own ID (i.e., the user's ID is set to a phone number of the user). Accordingly, such a solution is very limiting for users that do not have a phone, for users that share a phone, for users with unlisted phone numbers, etc.

Therefore, there is a need for method, system and computer program product for controlling data access, while providing flexibility, security and simplicity.

SUMMARY OF THE INVENTION

The above and other needs are addressed by the present invention, which provides an improved method, system and computer program product for controlling data access through a question and answer mechanism. The present invention lets a user create a single, permanent and universally known identity with various levels of privacy and authorization. The present invention allows for varying levels of access, depending on who is requesting the information. For example, a family member may have broader access to the user's personal information, whereas a casual contact may have limited access to the user's personal information.

Accordingly, in one aspect of the present invention there is provided an improved method, system and computer program product for controlling data access through a question and answer mechanism, including assigning a unique user identification for a user; associating information of the user with the user identification; receiving a request for the information based on the user identification; generating a question, based on a relationship between the user and a requestor of the information, that the requestor of the information must answer in order to access the information; and providing access to one of a portion of the information and all of the information, based on the relationship between the user and the requestor of the information, if the requestor correctly answers the question.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3a-3m are exemplary screen shots illustrating the controlling of data access through a question and answer mechanism, according to the present invention.

DETAILED DESCRIPTION OF THE PREFERRED EMBODIMENTS

A method, system and computer program product for controlling data access through a question and answer mechanism, according to the present invention; are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
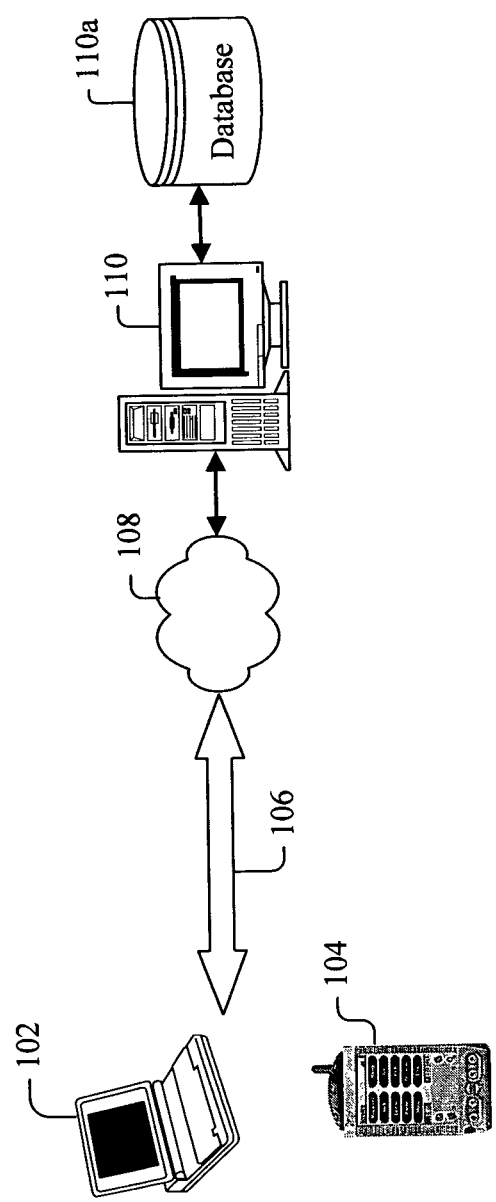
FIG. 1 is a top-level block diagram illustrating a system that may be used for controlling data access through a question and answer mechanism, according to the present invention.

Referring now to the drawings, wherein like reference numerals designate identical or corresponding parts throughout the several views, and more particularly to FIG. 1 thereof, there is illustrated is a top level block diagram of a system 100 for controlling data access through a question and answer mechanism, according to the present invention. In FIG. 1, the system 100 includes a server 110 and corresponding database 110a and one or more devices 102 and 104, such as hand-held devices, personal digital assistants (PDAs), Internet appliances, personal computers, laptop computers, cellular phones, telephony devices, facsimile devices, etc. The server 110 may be coupled to the one or more devices 102 and 104 via a communications network 108 and/or a communications link 106.

In FIG. 1, the devices 102 and 104 communicate with the server 110 using, for example, TCP/IP via the communications network 108 and the communications link 106. The devices 102 and 104 may include a modem function (e.g., dial-up, DSL, cable, wireless, etc.) that can log in to the server 110 with user validation (e.g., via a personal identification number (PIN), user name and password, etc.).

The server 110 communicates with the devices 102 and 104 using any suitable protocol over, for example, TCP/IP via the communications network 108 and/or the communications link 106. The server 110 may include all software and hardware to provide, for example, user account maintenance, validation and access control level (ACL) information, a directory server where a user's personal information is kept, etc. The devices 102 and 104, the server 110, the system 100, etc., may be implemented using one or more of the computer system 401 of FIG. 4, for example.

Accordingly, the systems 102-110 are any suitable servers, workstations, personal computers (PCs), personal digital assistants (PDAs), Internet appliances, other devices, etc., capable of performing the processes of the present invention. The systems 102-110 may communicate with each other using any suitable protocol via the communications network 108 and/or the communications link 106.

It is to be understood that the system in FIG. 1 is for exemplary purposes only, as many variations of the specific hardware used to implement the present invention are possible, as will be appreciated by those skilled in the relevant art(s). For example, the functionality of the one or more of the systems 102-110 may be implemented via one or more programmed computers or devices. To implement such variations as well as other variations, a single computer (e.g., the computer system 401 of FIG. 4) may be programmed to perform the special purpose functions of, for example, the systems 102, 104 and/or 110 shown in FIG. 1. On the other hand, two or more programmed computers or devices, for example as in shown FIG. 4, may be substituted for any one of the systems 102-110. Principles and advantages of distributed processing, such as redundancy, replication, etc., may also be implemented as desired to increase the robustness and performance of the system 100, for example.

The communications network 108 may be implemented via one or more communications networks (e.g., the Internet, an Intranet, a wireless communications network, a satellite communications network, a cellular communications network, a Public Switched Telephone Network (PSTN), a hybrid network, etc.), as will be appreciated by those skilled in the relevant art(s). Similarly, the communications link 106 may be implemented via one or more communications links (e.g., an Internet communications link, an Intranet communications link, a wireless communications link, a satellite communications link, a cellular communications link, a PSTN communications link, a hybrid communications link, etc.)

Figure 4:
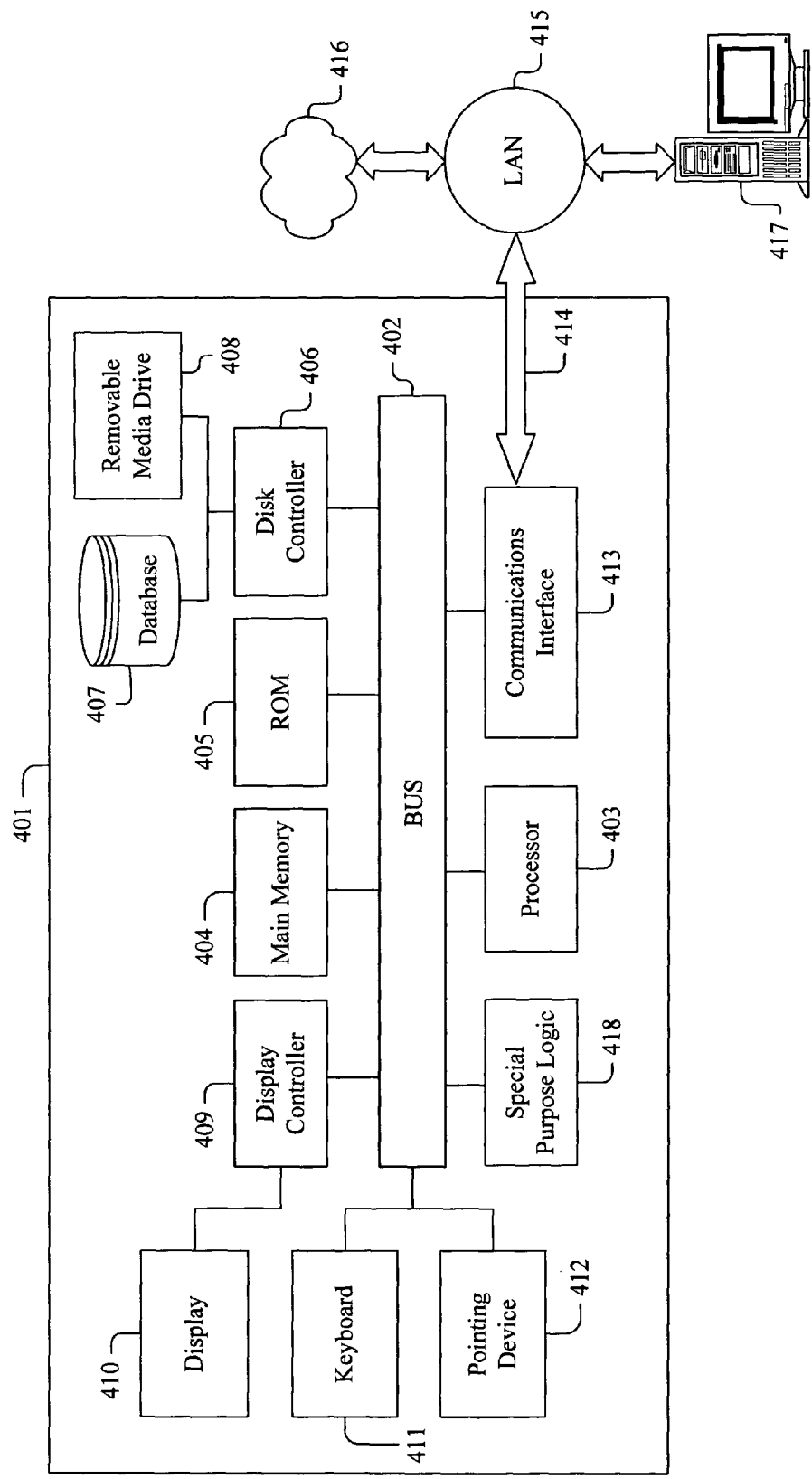
FIG. 4 is an exemplary computer system, which may be programmed to perform one or more of the processes of the present invention.

In a preferred embodiment of the present invention, the communications network 108 and/or the communications link 106 preferably use electrical, electromagnetic, optical signals, etc., that carry digital data streams, as are further described with respect to FIG. 4.

The operation of the system 100 for controlling data access through a question and answer mechanism, according to the present invention, will now be described with reference to FIGS. 2-4. Generally, the present invention provides for a permanent, global, user ID that is created and used to identify the user of the ID. The user ID provides for a linkage to the user's personal information, such as the user's phone numbers, pager numbers, e-mail addresses, post office addresses, etc., which is stored in the database 110*a* of the server 110 and may be accessed by requestors of the user's personal information via the one or more of the devices 102 and 104. Basically, the user is assigned a single user ID for life of the user and that typically never changes. Then, when a requestor of the user's information wants to e-mail, call, etc., the user, the requestor does not need to know all of the various numbers or methods to getting in touch with the user. Such a requestor merely needs to know the user's ID or alternatively the requestor can look up the user's ID via the server 110. As will be appreciated by those skilled in the relevant art(s), the present invention is not limited to conventional Web-based implementations, but rather may be implemented using other implementations, such as a Wireless Application Protocol (WAP) [3] implementation, a conventional dialup implementation, as an electronic service implementation, etc.

Accordingly, the present invention solves privacy problems previously discussed by letting a user setup questions that requestors of the user's personal information must answer (e.g., based on selectable degrees of accuracy) in order to access the user's personal information. Based on the question that a given type requestor (e.g., family member, friend, business contact, co-worker, casual contact, etc.) must answer, the user can select which items in their profile of personal information is made available to or given access to the given type requestor.

For example, a user could set up a question for a business contact type of requestor that asks, "Where do I work?" with the correct answer being "WorldCom." If the business contact type of requestor answers correctly, they will be shown or given access to only the personal information of the user that the user has enabled for business contact types of requestors, such as the user's work information, but not the user's home information. In addition, the user may also select which fields may be searched and which fields may be viewed by the various types of requestors wishing to access the user's personal information.

Accordingly, when the user creates the user's identity on the server 110, the user may set up respective questions and answers for each type of requestor. For example, the user may specify respective questions and answers for casual contacts, family members, friends, co-workers, business contacts, etc., in order for such contacts to gain access to respective portions of the user's personal information.

For each type of requestor that the user chooses to allow access to a specified portion of the user's information, the user may define a question that each type requestor (e.g., a person or system) responds to in order to gain access to the to the specified portion of the user's information. The user may also define the type of answer expected and depending on the type of requestor, the value(s) that are allowed as the answer. Such an answer may be an exact match, a partial match, a close match, anything, an e-mail address, etc. For example, if user enables a "friend" type of requestor relationship and the user sets up a question to ask, "Please enter pass code," the user could then specify that the answer must be "stranger" and that the answer must be an exact match.

Once a given type of requestor has correctly answered the respective question of the user, the requestor may be granted access to respective portions of the user's personal information. In a preferred embodiment, the requestor may only be permitted access to a portion of the user's personal information that the user has specifically granted such a requestor access to. The user grants this access based on the relationship to the requestor, as previously discussed. For example, the user might grant a friend or a family member access to the user's home phone number, but not allow other types of requestors access to such information.

The present invention may be implemented, for example, as a directory service, as a programmatic interface that allows a system to authenticate users through the server 110 of the present invention, etc. For example, once a user is authenticated, providing that the user allows such a feature, the server 110 may communicate confidential information, such as credit card information, phone numbers, etc., to a requesting system. Accordingly, interfaces to the server 110 may allow other computer systems to authenticate users according to the processes of the present invention. The server 110 of the present invention may further provide a "portal" of related services, such as an online contacts management service, an online management of favorite Web links service, a schedule keeping service, a user's home page service, an information change notification service (e.g., address change notification to the post office, friends, etc.), an authentication and authorization service, an electronic business card service, a value-added service for other products (e.g., e-mail packages could interface to the server 110 to resolve a provided user ID into an e-mail address, etc.), a call tree service, a follow-me service [4], a find-me service [5], etc.

According to the present invention, once a user has a profile set up, other applications can then use the profile of the user to contact the user or to contact the user's contacts. For example, if a requestor wants to e-mail, page, call, etc., the user, all that the requestor needs to know is the user's ID. The e-mail software simply looks up the e-mail address of the user based on the user's ID via the server 110. If the user's e-mail address is not public (i.e., not enabled for such contact), the e-mail software prompts the requestor to answer an appropriate question for such a type of requestor in order to gain access to the user's e-mail address. Such e-mail software may be configured to "remember" the answer given by the requestor so that the software does not need to prompt the requestor in the future. Of course, if the user changes to the questions and answers for allowing access to the user's personal information, the software may merely again prompt the requestor for the correct answer. In addition, the user may control how much or how little of the user's personal information is made public (i.e., is not subjected to the question and answer mechanism). Thus, the present invention will automatically allow a requestor to gain access to the user's latest/current personal information, because the user's ID typically never changes. Of course, in the case of identity fraud or for other reasons, the user may choose to change the user's ID in which case the user distributes the new user ID to the user's contacts.

As another example, the present invention may be set up as a "find-me" service, wherein a find-me service may first call the user's home, then user's office, then the user's cell phone, etc. The present invention also may be set up as a "follow-me" service, wherein a follow-me service simply determines how the user is to be contacted at a present time (e.g., the user is at the office, at home, etc). In the latter case, for example, a requestor may want to call the user from the requestor's cell phone. However, the requestor may not know where the user is or the user's number. The user, however, has set up a "follow-me" service with the user's cell phone number on the server 110.

In the above scenario, in one embodiment, when the requestor calls the user from the requestor's cell phone using the user's ID, the cell phone connects to the server 110 and passes the user's ID to the server 110, authenticates the requestor with the appropriate question and answer mechanisms, if necessary, and passes/connects the user's cell phone to/with the requestor's cell phone. In another embodiment, the server 110 passes the phone number, or phone numbers of the user, back to requestor's cell phone and then the requestor's cell phone attempts to find the user given the received numbers for the user. This embodiment may be preferred because it is easier to implement and allows more flexibility as to the devices that can work with the service. For example, if the user is using the find-me service, then one of the numbers returned might be a pager number or an email address, which the cell phone described in the first embodiment may not be capable of supporting. Accordingly, as will be apparent to those skilled in the relevant art(s), numerous other new products, services and/or features may be enabled via the data access service of the present invention.

Figure 2A:
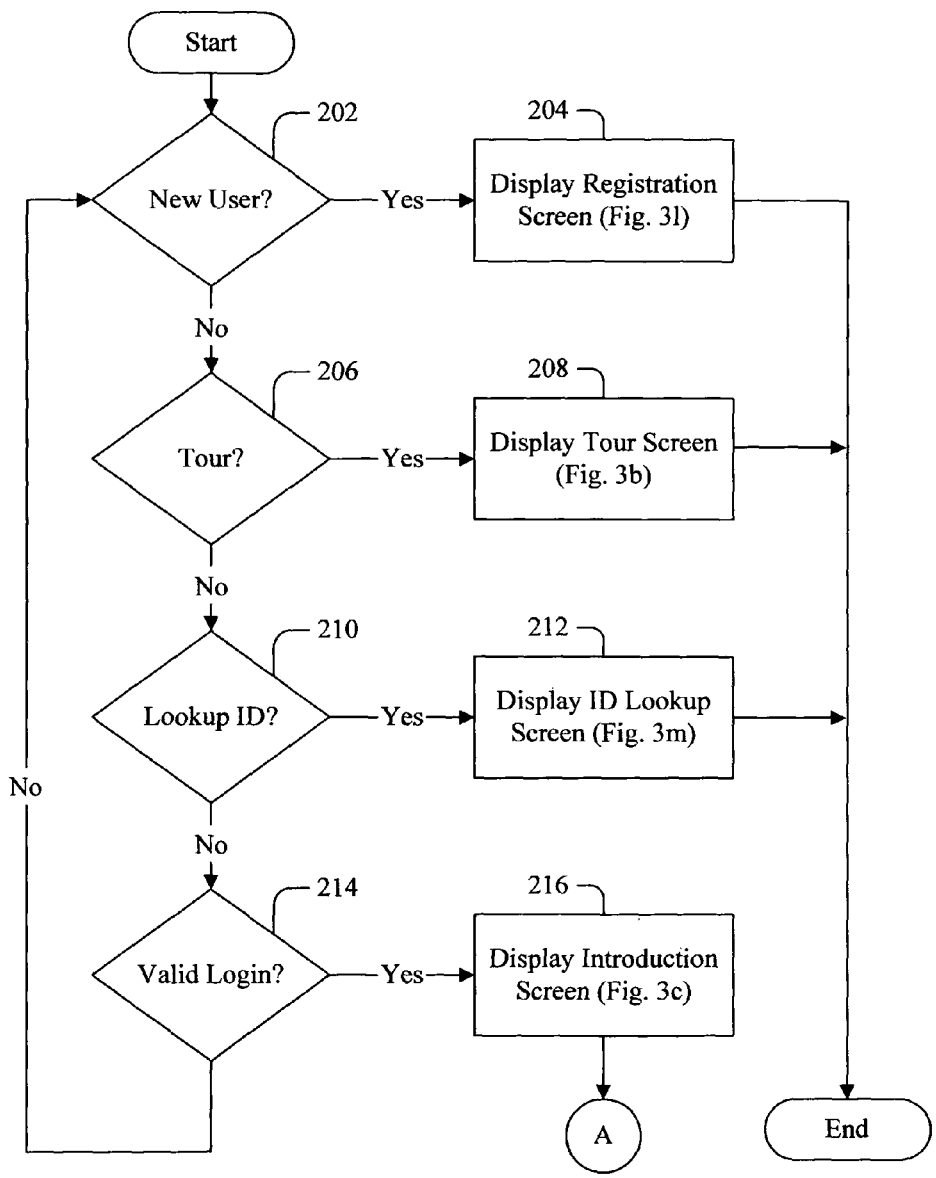
FIGS. 2a-2b is a flowchart illustrating the controlling of data access through a question and answer mechanism, according to the present invention.
Figure 2B:
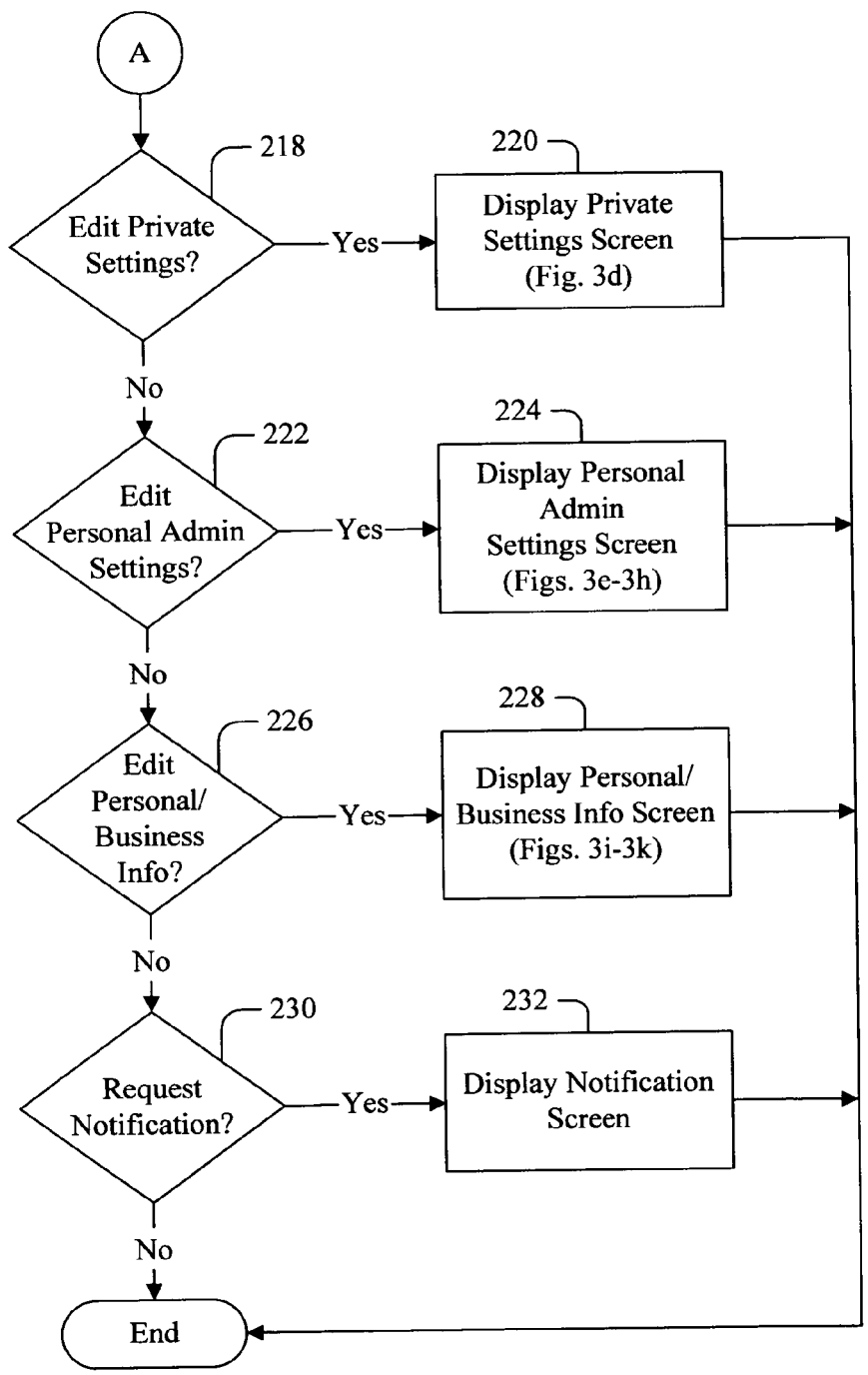

The above-noted interactive processes performed by the present invention will now be further described with respect to the flowchart of FIGS. 2a-2b, which references exemplary screen shots of FIGS. 3a-3m. The exemplary screen shots of FIGS. 3a-3m are displayed on a Web browser (e.g., Internet Explorer, Netscape, etc.) of the client devices 102 and 104 served by the server 110 (e.g., configured as a Web server, etc.) over the communications network 108 and the communications link 106. In FIG. 2a, after an initial screen (FIG. 3a) is displayed by the server 110, if it is determined at step 202 that a new user wishes to register with the server 110, the server 110 displays an appropriate registration screen (FIG. 3l) for registering the new user at step 204. Otherwise, if it is determined at step 206 that a user wishes to take a tour, the server 110 displays a tour screen (FIG. 3b) for allowing user to tour various features of the present invention at step 208. Otherwise, if it is determined at step 210 that a user wishes to lookup a user ID, the server 110 displays a user ID lookup screen (FIG. 3m) for allowing the user to look up the ID of a user of the present invention at step 212. Otherwise, if it is determined at step 214 that a user has logged in with a valid user ID and password, the server 110 displays an introduction screen (FIG. 3c) for allowing the user to access various features of the present invention at step 216 and control transfers to step 218 of FIG. 2b.

In FIG. 2b, if it is determined at step 218 that the user wishes to edit the user's private settings, the server 110 displays a private settings screen (FIG. 3d) for allowing the user to edit various private settings at step 220. Otherwise, if it is determined at step 222 that the user wishes to edit the user's administrative settings, the server 110 displays an administrative settings screen (FIGS. 3e-3g) for allowing the user to edit various administrative settings at step 224. Otherwise, if it is determined at step 226 that the user wishes to edit the user's personal/business information, the server 110 displays a personal/business information screen (FIGS. 3h-3k) for allowing the user to edit various personal/business information settings at step 228. Otherwise, if it is determined at step 230 that the user wishes to edit the user's notification settings, the server 110 displays a notifications screen (not shown) for allowing the user to edit various methods of notification when the user's information has been accessed at step 232.

Figure 3A:
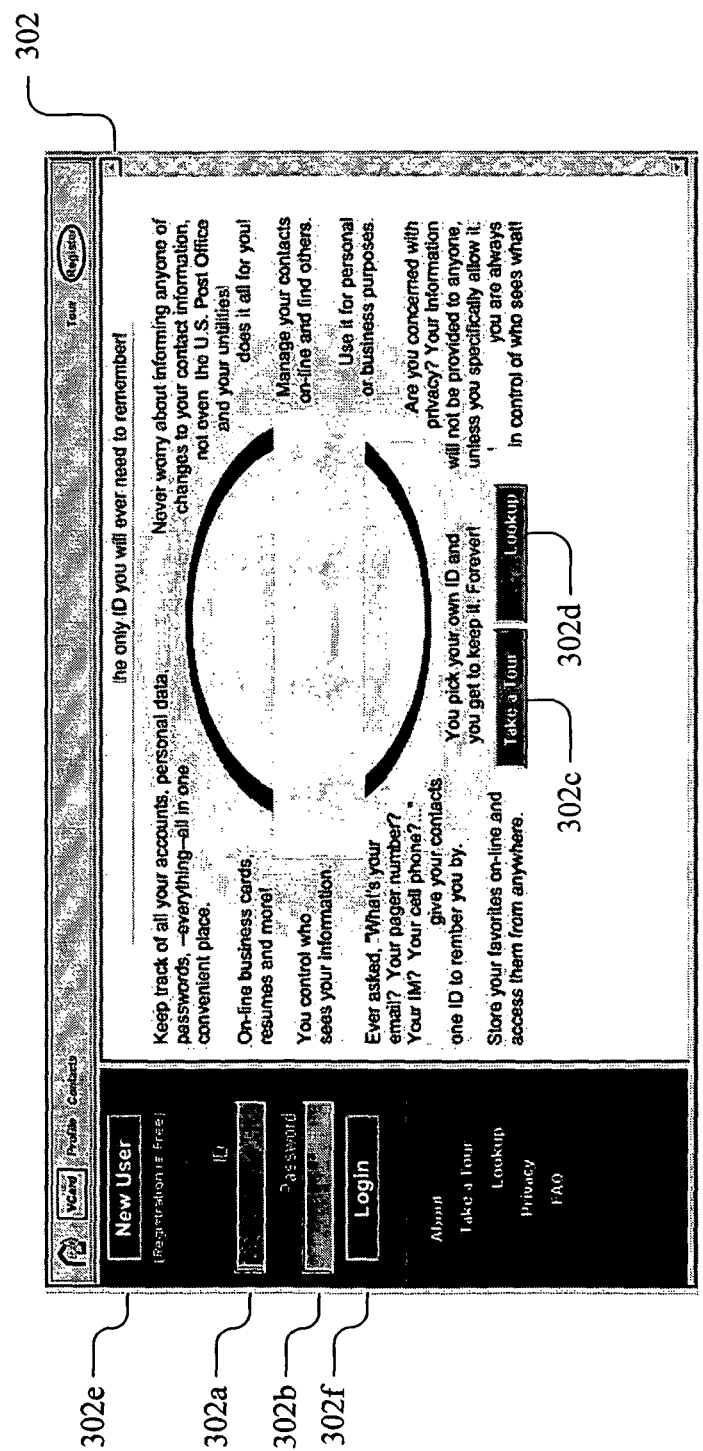

FIGS. 3a-3m are exemplary screen shots illustrating the controlling of data access through a question and answer mechanism, according to the present invention. FIG. 3a is an exemplary screen shot illustrating a login screen 302 provided by the server 110 of the present invention. In FIG. 3a, a user ID field 302a and a password field 302b are provided for logging in the user into the server 110 via the login button 302f. The screen 302 further includes a button 302c for enabling a tour of the features of the present invention, a button 302*d* for enabling lookup of an ID of a user of the present invention and a button 302*e* for registering a new user of the present invention.

Figure 3B:
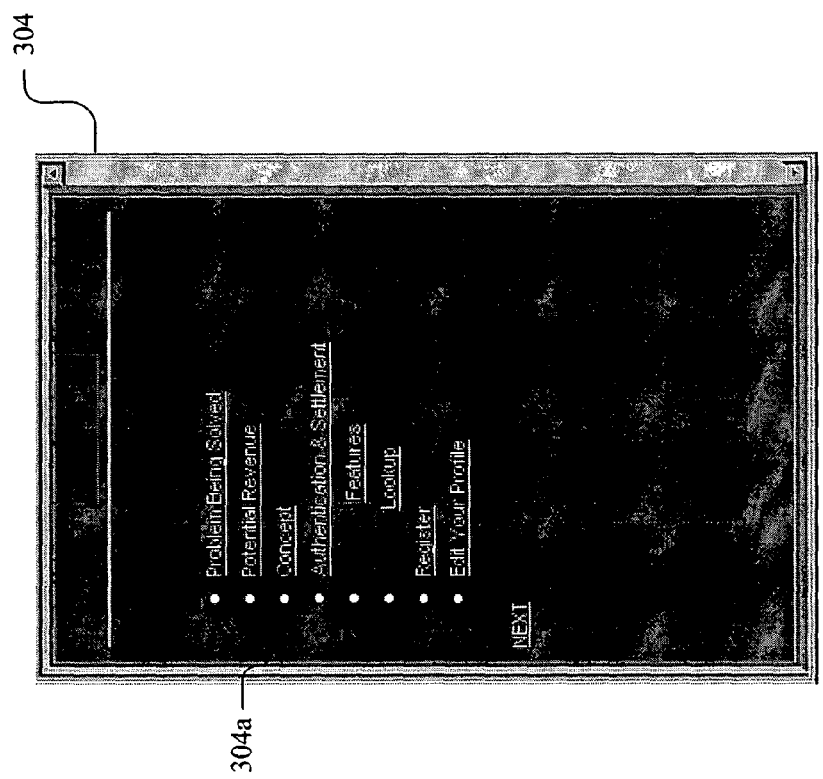

FIG. 3*b* is an exemplary screen shot illustrating an online tour screen 304 provided by the server 110 of the present invention. In FIG. 3*b*, the screen 304 is enabled via activation of the button 302*c* for familiarizing the user with various features of the present invention. The screen 304 further includes selections 304*a* corresponding to various parts of the tour.

Figure 3C:
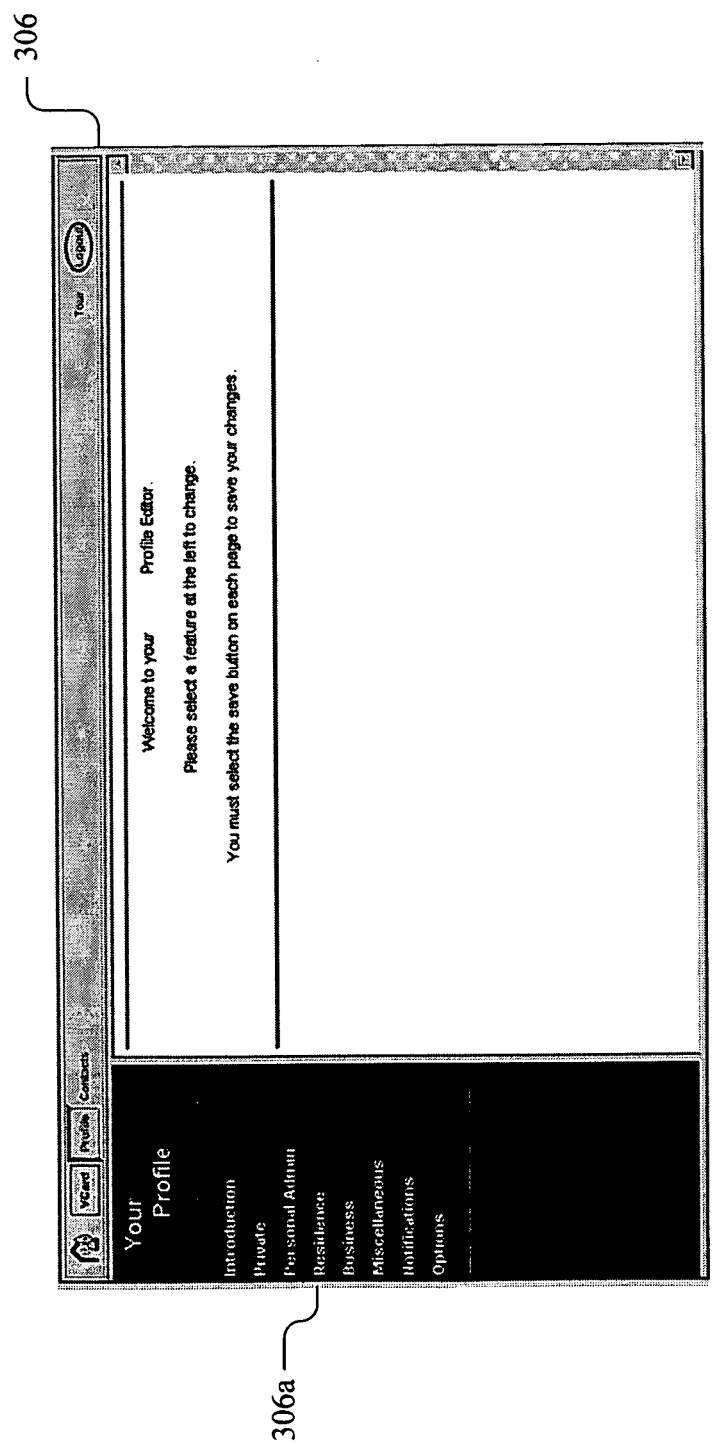

FIG. 3*c* is an exemplary screen shot illustrating a profile menu set up screen 306 provided by the server 110 of the present invention. In FIG. 3*c*, the screen 306 includes selections 306*a* for setting up the profile for the user.

Figure 3D:
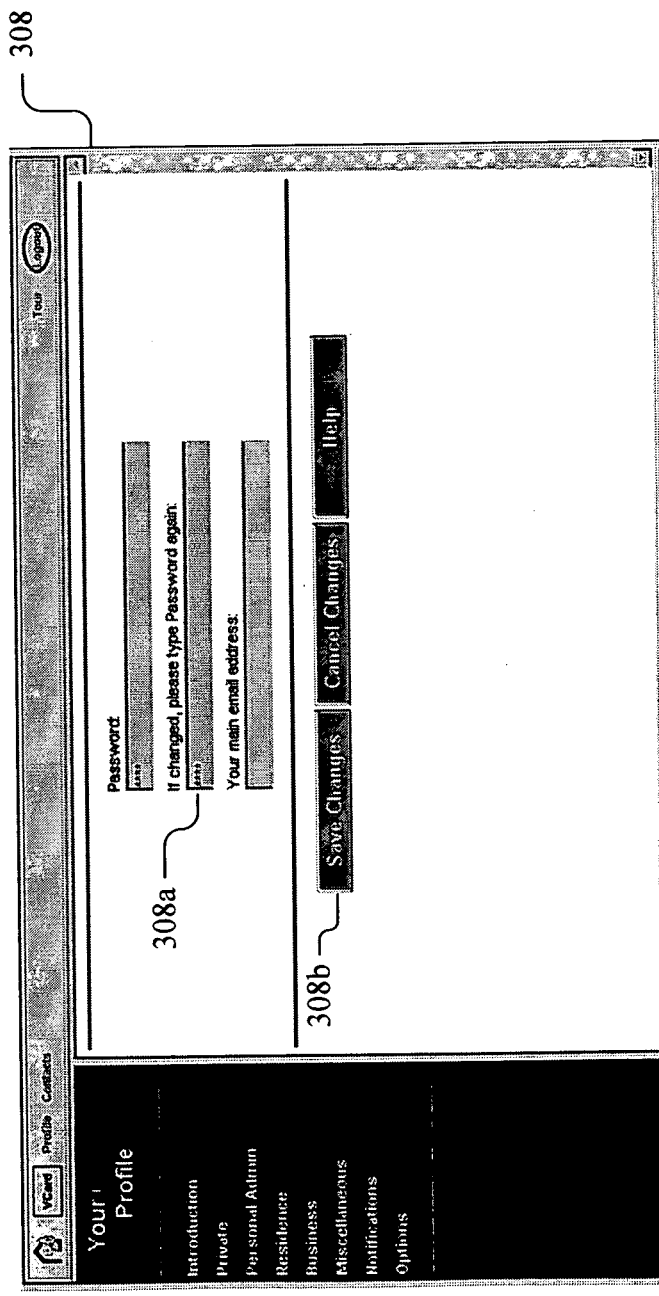

FIG. 3*d* is an exemplary screen shot illustrating a user's personal settings screen 308 provided by the server 110 of the present invention. In FIG. 3*d*, the screen 308 includes fields 308*a* for setting up the user's personal settings, such as password, e-mail address, etc. The screen 308 further includes buttons 308*b* for saving changes, canceling changes and accessing online help.

Figure 3E:
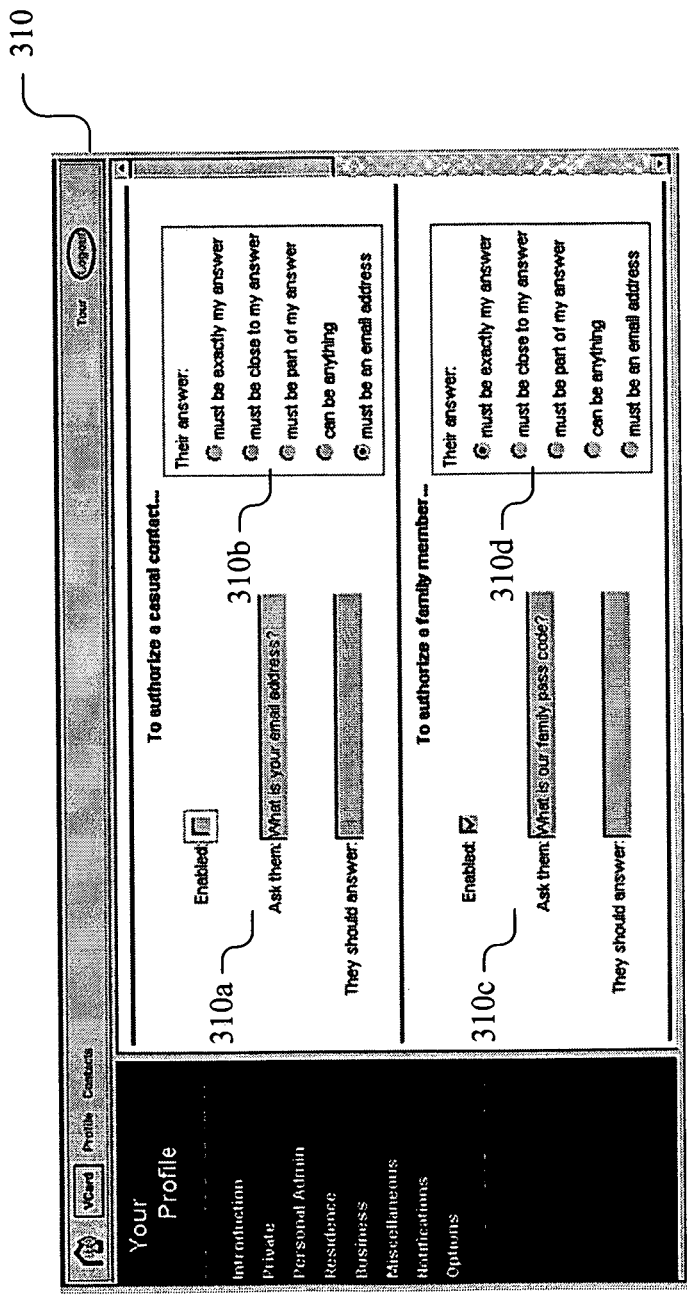
Figure 3F:
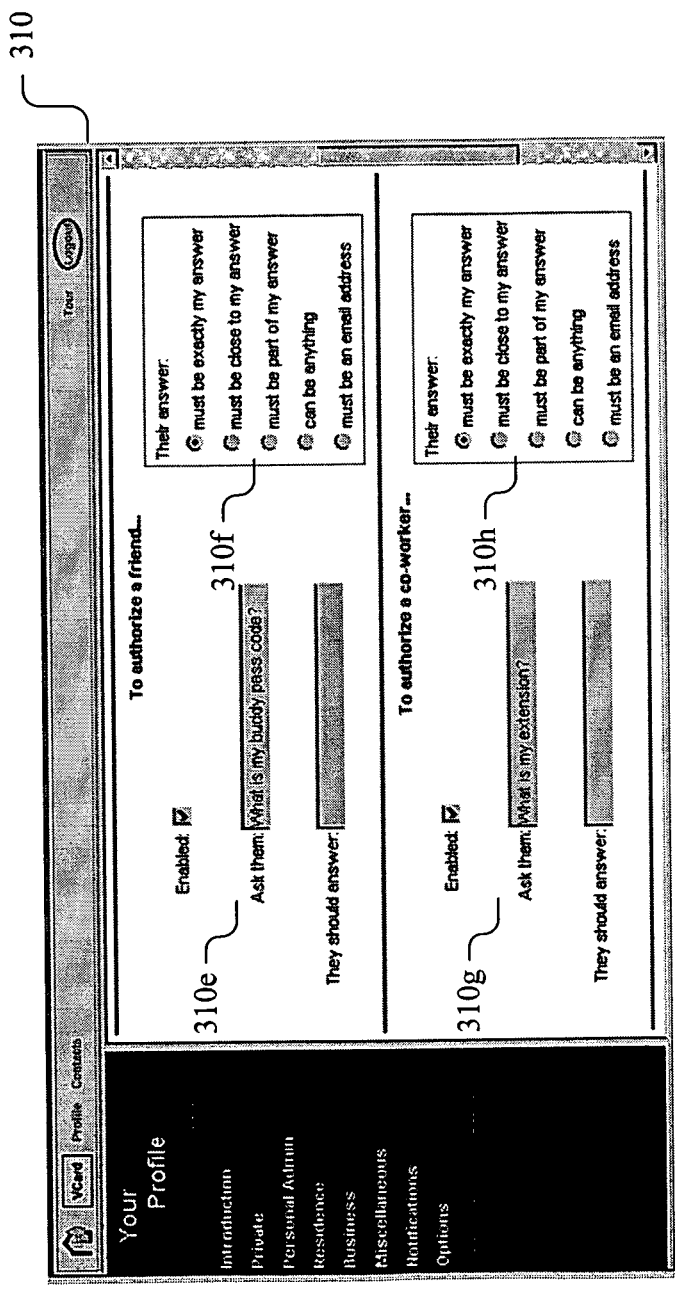
Figure 3G:
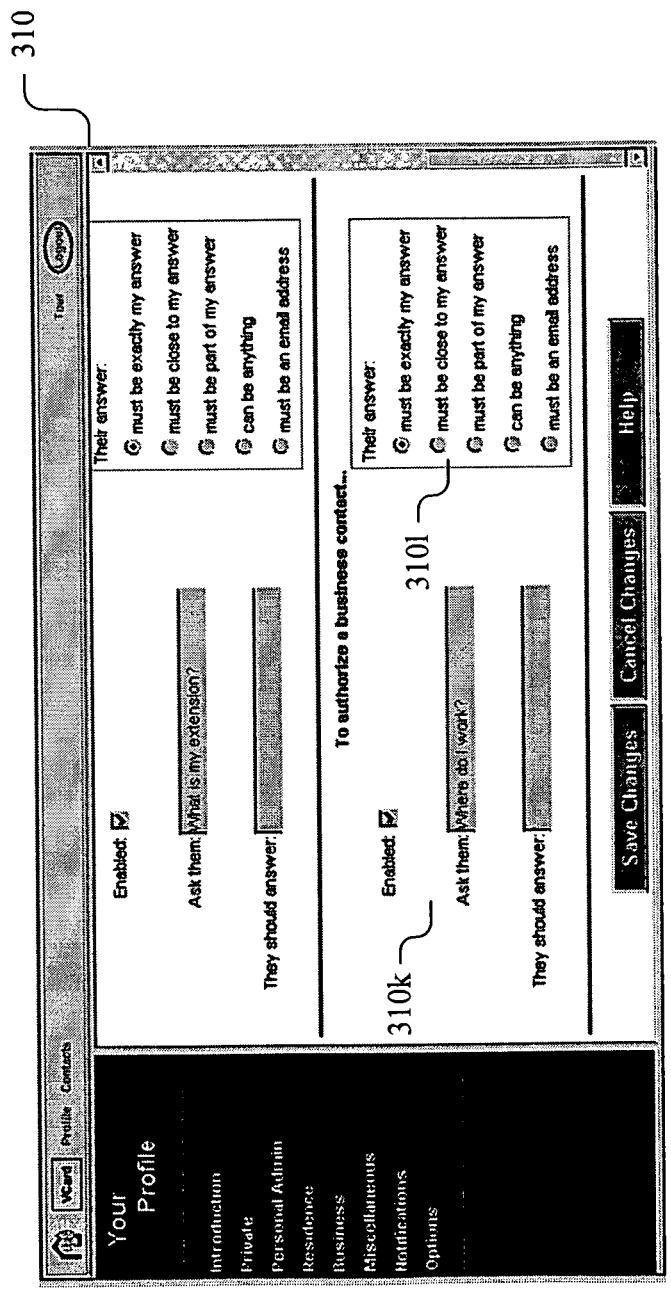
Figure 3H:
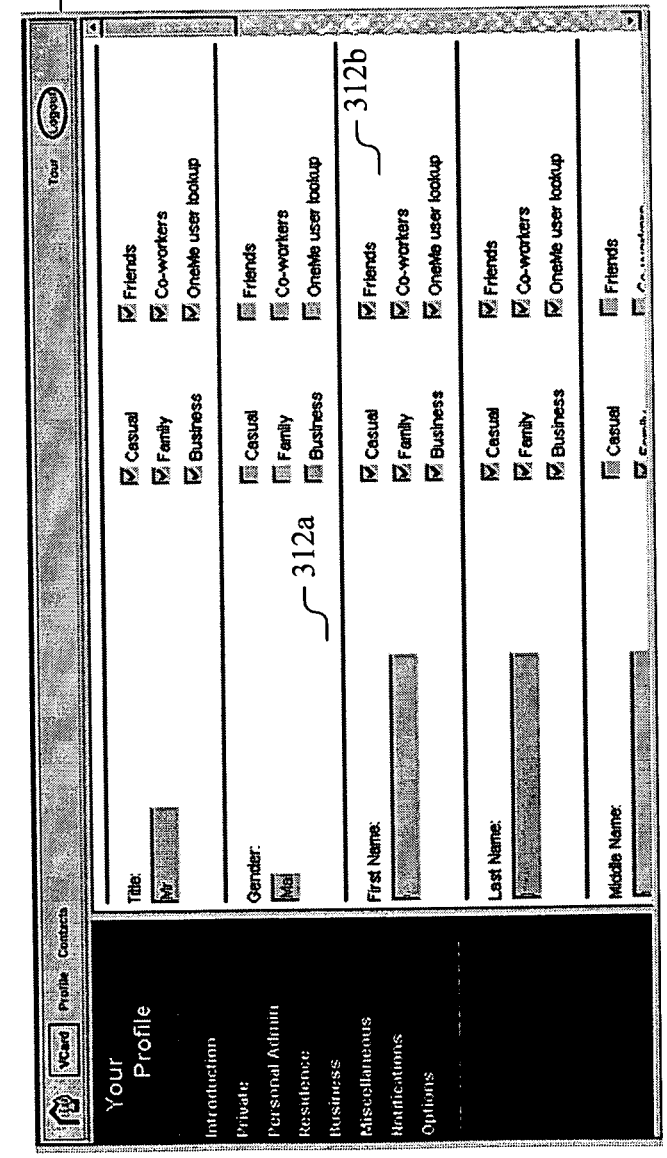
Figure 3I:
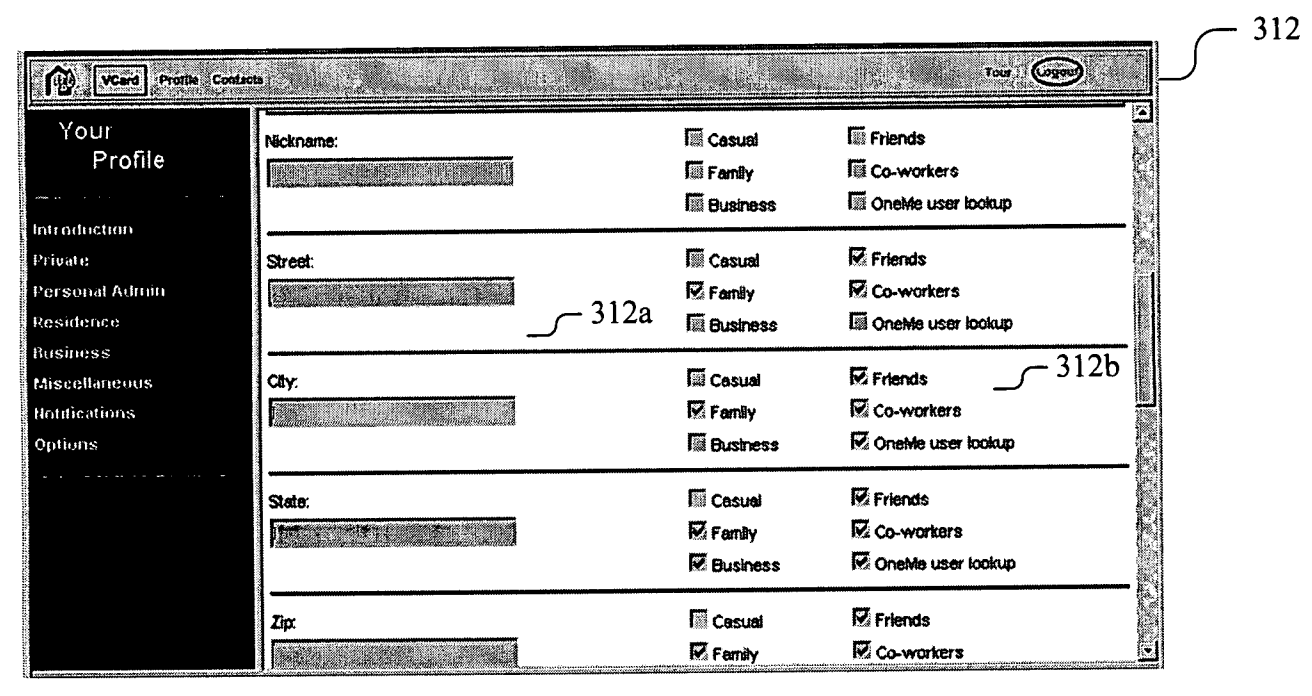
Figure 3J:
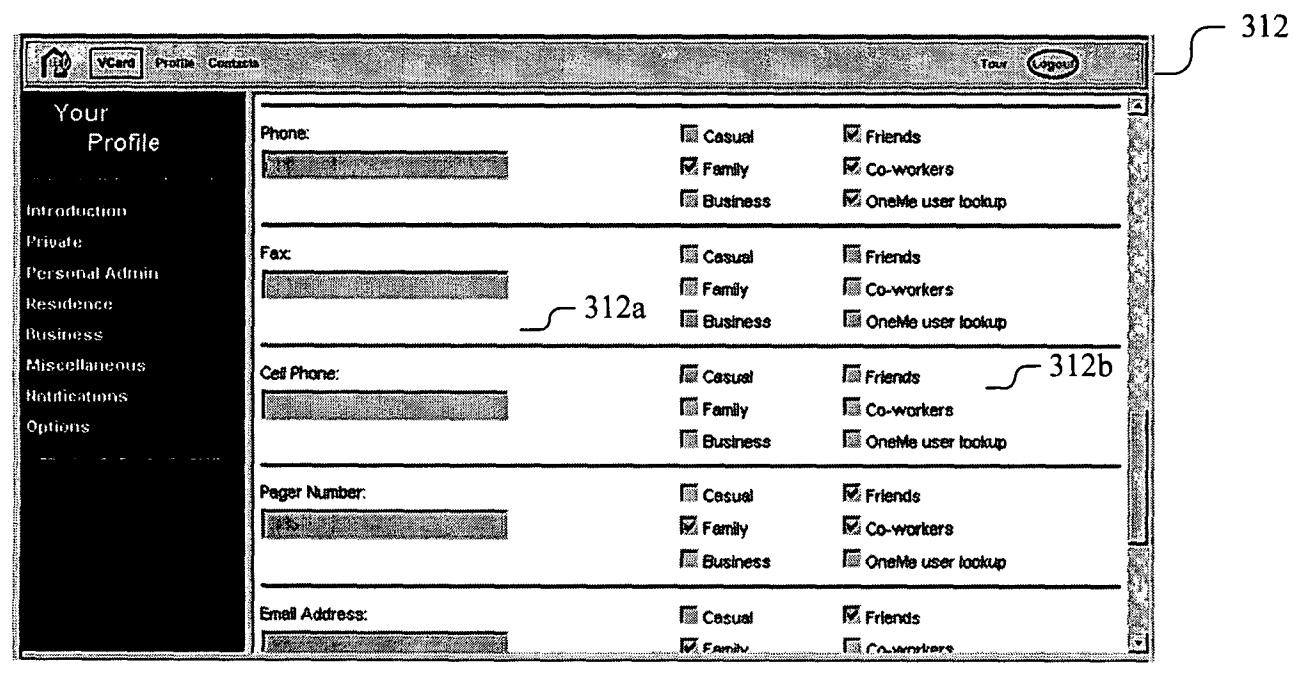
Figure 3K:
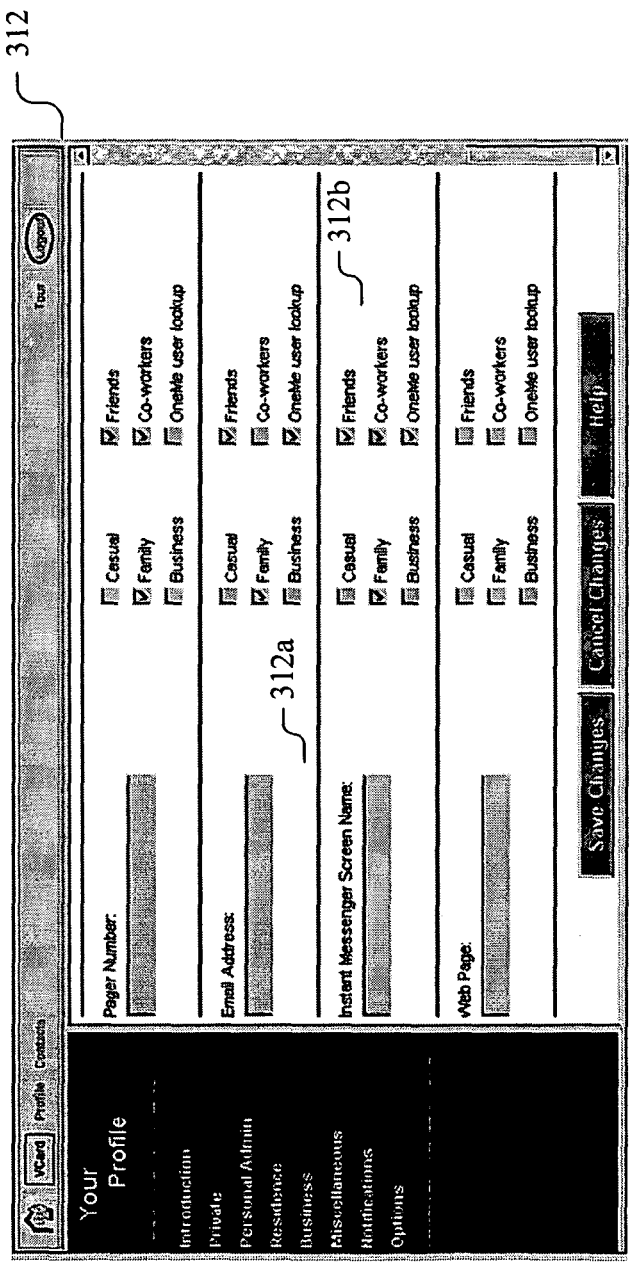
Figure 31:
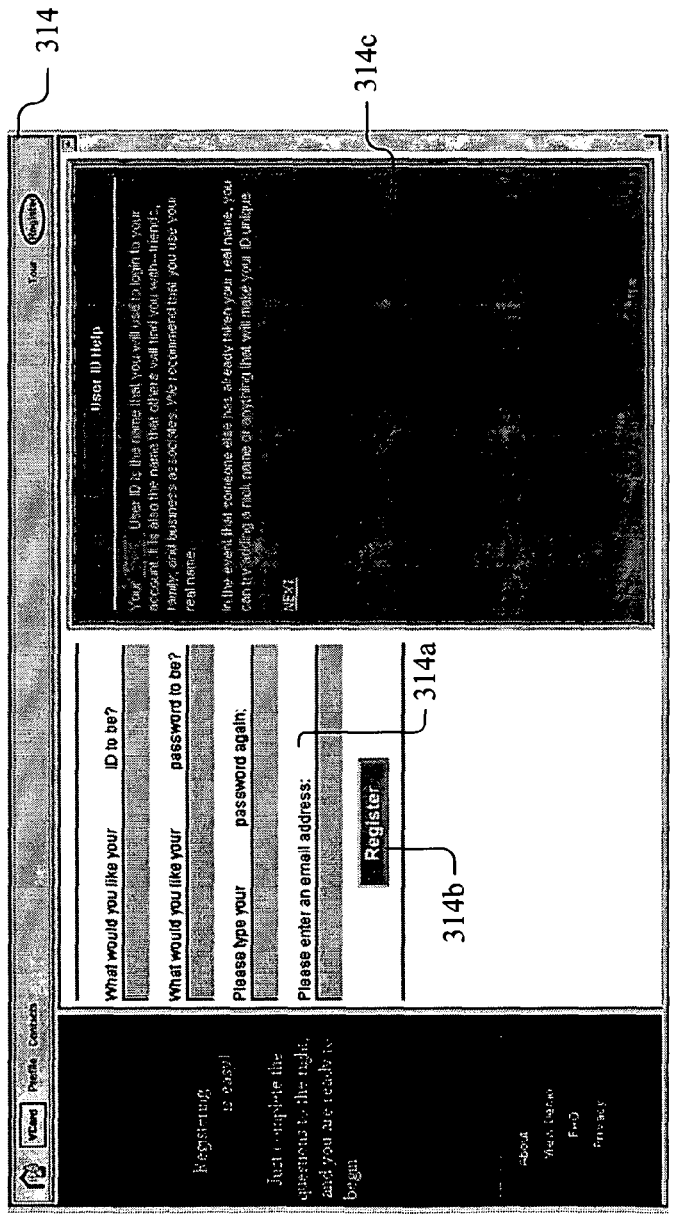

FIGS. 3*e*-3*g* are exemplary screen shots illustrating a personal administration screen 310 provided by the server 110 of the present invention. In FIG. 3*e*, the screen 310 includes fields 310*a* for setting up a question and answer for access to corresponding personal information of the user by a casual contact and selections 310*b* for specifying a degree of accuracy for the answer. The screen 310 further includes fields 310*c* for setting up a question and answer for access to corresponding personal information of the user by a family member and selections 310*d* for specifying a degree of accuracy for the answer.

In FIG. 3*f*, the screen 310 further includes fields 310*e* for setting up a question and answer for access to corresponding personal information of the user by a friend and selections 310*f* for specifying a degree of accuracy for the answer. The screen 310 further includes fields 310*g* for setting up a question and answer for access to corresponding personal information of the user by a co-worker and selections 310*h* for specifying a degree of accuracy for the answer.

In FIG. 3*g*, the screen 310 further includes fields 310*k* for setting up a question and answer for access to corresponding personal information of the user by a business contact and selections 310*l* for specifying a degree of accuracy for the answer.

FIGS. 3*h*-3*k* are exemplary screen shots illustrating a personal administration screen 312 provided by the server 110 of the present invention. In FIGS. 3*h*-3*k*, the screen 312 includes fields 312*a* for setting up personal/business information of the user and selections 312*b* for indicating which contacts may gain access to the corresponding information based on the corresponding questions and answers for a given contact provided in FIGS. 3*e*-3*g*.

FIG. 3*l* is exemplary screen shot illustrating a registration screen 314 provided by the server 110 of the present invention for registering a new user. In FIG. 3*l*, the screen 314 includes fields 314*a* for setting up registration parameters (e.g., user ID, password, e-mail address, etc.) for the user, a registration button 314*b* and a help area 314*c*.

Figure 3M:
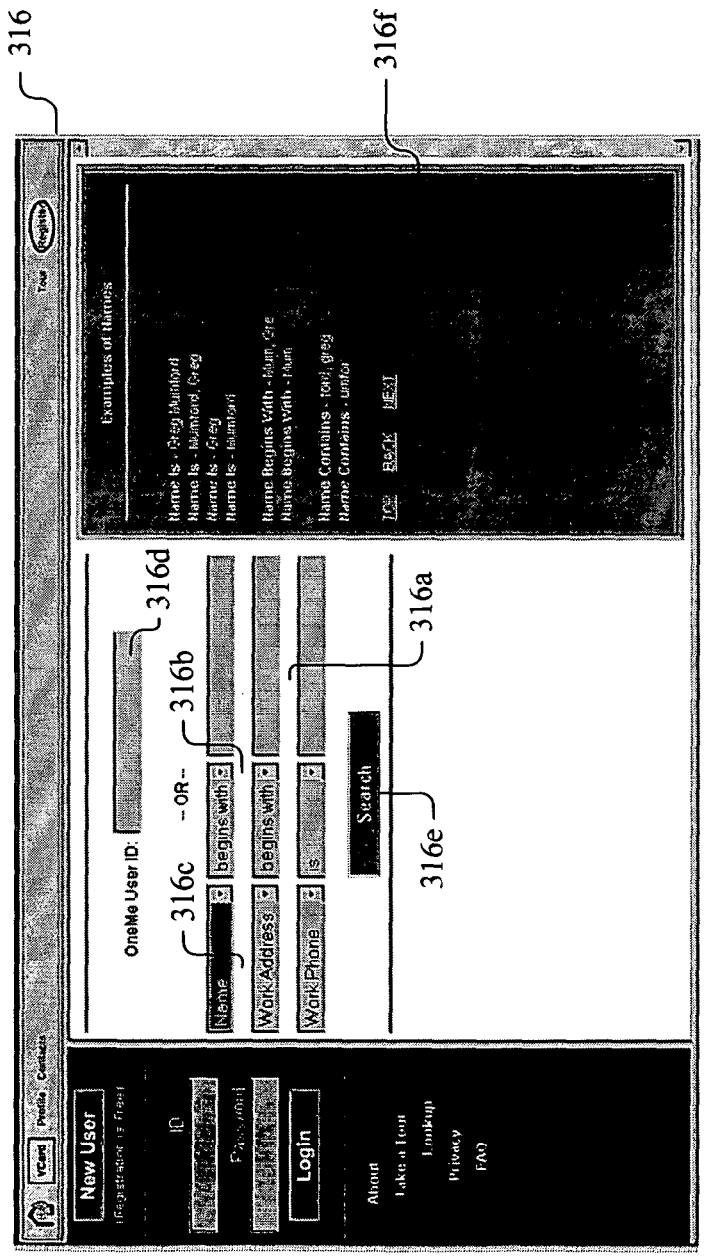

FIG. 3*m* is exemplary screen shot illustrating a search screen 316 provided by the server 110 of the present invention for searching for registered users. In FIG. 3*m*, the screen 316 includes fields 316*a* and 316*d* for setting up search parameters. The search parameters may include, for example, a user ID entered into field 316*d*, a user name, address, and/or phone number, entered in fields 316*a*, etc. The search parameters may further include, for example, selectable degrees of correctness parameters 316*b*, such as "begins with," "is," "contains," etc. The screen 316 further includes a search button 314*e* for initiating a search based on the entered and selected parameters 316*a*-316*d* and a help area 316*f* for providing examples for filling in the various search parameters 316*a*-316*d*.

In addition, the server 110 of the present invention may also provide a screen (not shown) for allowing the user to request to be notified (e.g., via e-mail, fax, pager, phone call, IM, etc.) whenever someone or some system attempts to or accesses the server 110 for the user's profile information. The above-noted feature may be applicable to other services, such as 1+ or 411 directory assistance services, etc., as will be appreciated by those skilled in the relevant art(s).

The present invention stores information relating to various processes described herein. This information is stored in one or more memories, such as a hard disk, optical disk, magneto-optical disk, RAM, etc. One or more databases, such as the databases 110*a*, databases includes in the devices 102 and 104, etc., may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 4, for example.

The previously described processes include appropriate data structures for storing data collected and/or generated by the processes of the system 100 of FIG. 1 in one or more databases thereof. Such data structures accordingly will include fields for storing such collected and/or generated data. In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

All or a portion of the invention (e.g., as described with respect to FIGS. 1-3) may be conveniently implemented using one or more conventional general purpose computers, microprocessors, digital signal processors, micro-controllers, etc., programmed according to the teachings of the present invention (e.g., using the computer system of FIG. 4), as will be appreciated by those skilled in the computer art. Appropriate software can be readily prepared by programmers of ordinary skill based on the teachings of the present disclosure, as will be appreciated by those skilled in the software art. In addition, the present invention (e.g., as described with respect to FIGS. 1-3) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 4).

FIG. 4 illustrates a computer system 401 upon which the present invention (e.g., systems 102-110, etc.) can be implemented. The present invention may be implemented on a single such computer system or a collection of multiple such computer systems. The computer system 401 includes a bus 402 or other communication mechanism for communicating information, and a processor 403 coupled to the bus 402 for processing the information. The computer system 401 also includes a main memory 404, such as a random access memory (RAM), other dynamic storage device (e.g., dynamic RAM (DRAM), static RAM (SRAM), synchronous DRAM (SDRAM)), etc., coupled to the bus 402 for storing information and instructions to be executed by the processor 403. In addition, the main memory 404 can also be used for storing temporary variables or other intermediate information during the execution of instructions by the processor 403. The computer system 401 further includes a read only memory (ROM) 405 or other static storage device (e.g., programmable ROM (PROM), erasable PROM (EPROM), electrically erasable PROM (EEPROM), etc.) coupled to the bus 402 for storing static information and instructions.

The computer system 401 also includes a disk controller 406 coupled to the bus 402 to control one or more storage devices for storing information and instructions, such as a magnetic hard disk 407, and a removable media drive 408 (e.g., floppy disk drive, read-only compact disc drive, read/write compact disc drive, compact disc jukebox, tape drive, and removable magneto-optical drive). The storage devices may be added to the computer system 401 using an appropriate device interface (e.g., small computer system interface (SCSI), integrated device electronics (IDE), enhanced-IDE (E-IDE), direct memory access (DMA), or ultra-DMA).

The computer system 401 may also include special purpose logic devices 418, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 401 may also include a display controller 409 coupled to the bus 402 to control a display 410, such as a cathode ray tube (CRT), liquid crystal display (LCD), active matrix display, plasma display, touch display, etc., for displaying or conveying information to a computer user. The computer system includes input devices, such as a keyboard 411 including alphanumeric and other keys and a pointing device 412, for interacting with a computer user and providing information to the processor 403. The pointing device 412, for example, may be a mouse, a trackball, a pointing stick, etc., or voice recognition processor, etc., for communicating direction information and command selections to the processor 403 and for controlling cursor movement on the display 410. In addition, a printer may provide printed listings of the data structures/information of the system shown in FIGS. 1-3, or any other data stored and/or generated by the computer system 401.

The computer system 401 performs a portion or all of the processing steps of the invention in response to the processor 403 executing one or more sequences of one or more instructions contained in a memory, such as the main memory 404. Such instructions may be read into the main memory 404 from another computer readable medium, such as a hard disk 407 or a removable media drive 408. Execution of the arrangement of instructions contained in the main memory 404 causes the processor 403 to perform the process steps described herein. One or more processors in a multi-processing arrangement may also be employed to execute the sequences of instructions contained in main memory 404. In alternative embodiments, hard-wired circuitry may be used in place of or in combination with software instructions. Thus, embodiments of the present invention are not limited to any specific combination of hardware circuitry and/or software.

Stored on any one or on a combination of computer readable media, the present invention includes software for controlling the computer system 401, for driving a device or devices for implementing the invention, and for enabling the computer system 401 to interact with a human user (e.g., a user of the systems 102-110, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 401 also includes a communication interface 413 coupled to the bus 402. The communication interface 413 provides a two-way data communication coupling to a network link 414 that is connected to, for example, a local area network (LAN) 415, or to another communications network 416, such as the Internet. For example, the communication interface 413 may be a digital subscriber line (DSL) card or modem, an integrated services digital network (ISDN) card, a cable modem, a telephone modem, etc., to provide a data communication connection to a corresponding type of telephone line. As another example, communication interface 413 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 413 sends and receives electrical, electromagnetic and/or optical signals that carry digital data streams representing various types of information. Further, the communication interface 413 can include peripheral interface devices, such as a Universal Serial Bus (USB) interface, a PCMCIA (Personal Computer Memory Card International Association) interface, etc.

The network link 414 typically provides data communication through one or more networks to other data devices. For example, the network link 414 may provide a connection through local area network (LAN) 415 to a host computer 417, which has connectivity to a network 416 (e.g. a wide area network (WAN) or the global packet data communication network now commonly referred to as the "Internet") or to data equipment operated by service provider. The local network 415 and network 416 both use electrical, electromagnetic and/or optical signals to convey information and instructions. The signals through the various networks and the signals on network link 414 and through communication interface 413, which communicate digital data with computer system 401, are exemplary forms of carrier waves bearing the information and instructions.

The computer system 401 can send messages and receive data, including program code, through the network(s), network link 414 and communication interface 413. In an Internet example, a server (not shown) might transmit requested code belonging to an application program for implementing an embodiment of the present invention through the network 416, LAN 415 and communication interface 413. The processor 403 may execute the transmitted code while being received and/or store the code in storage devices 407 or 408 or other non-volatile storage for later execution. In this manner, computer system 401 may obtain application code in the form of a carrier wave. With the system of FIG. 4, the present invention may be implemented on the Internet as a Web Server 401 performing one or more of the processes according to the present invention for one or more computers coupled to the Web server 401 through the network 416 coupled to the network link 414.

The term "computer readable medium" as used herein refers to any medium that participates in providing instructions to the processor 403 for execution. Such a medium may take many forms, including but not limited to, non-volatile media, volatile media, transmission media, etc. Non-volatile media include, for example, optical or magnetic disks, magneto-optical disks, etc., such as the hard disk 407 or the removable media drive 408. Volatile media include dynamic memory, etc., such as the main memory 404. Transmission media include coaxial cables, copper wire, fiber optics, including the wires that make up the bus 402. Transmission media can also take the form of acoustic, optical, or electromagnetic waves, such as those generated during radio frequency (RF) and infrared (IR) data communications. As stated above, the computer system 401 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 415 and 416. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Although the present invention is described in terms of providing a single question and a single answer for accessing a user's information by a given type of requestor, multiple questions and answers may be provided for a given type of requestor, as will be appreciated by those skilled in the relevant art(s).

Recapitulating, the present invention solves privacy concerns by allowing a user to setup questions, which others must answer in order to gain access to the user's personal information. The present invention allows the user to decide which "relationships" of requestor(s) that the user wants to enable, allows the user the ability to create a question that that a given relationship must be able to answer, allows the user the ability to specify what the answer to the question is and the degree of correctness of the answer and allows the user the ability to specify the level of access that the requestor is granted to the personal information of the user.

While the present invention has been described in connection with a number of embodiments and implementations, the present invention is not so limited but rather covers various modifications and equivalent arrangements, which fall within the purview of the appended claims.

LIST OF REFERENCES

[1] A computer conference using the keyboard (a keyboard chat) over the Internet between two or more people. Instant messaging is not a dial-up system like the telephone; it requires that both parties be online at the same time. You have to put the names of people you want to instant message with in a list, and when any of those individuals log on, you are "instantly" notified so that you can begin an interactive chat session. AOL's Instant Messenger (AIM), Microsoft Network Messenger Service (MSNMS), ICQ and Yahoo! Messenger are the major instant messaging services.

[2] A protocol from the Internet Engineering Task Force (IETF) that is used to obtain information about a telephone number. Designed for the Internet as well as private networks, a record stored in a Domain Name System (DNS) server contains the telephone number of an individual device, its particular attributes (e.g., can it receive numeric messages or text messages?, Internet capable?, etc.) as well as any pager or fax numbers, IP or e-mail addresses that are associated with it. ENUM is expected to provide a one-stop directory for contacting people and services.

[3] A standard for providing cellular phones, pagers and other handheld devices with secure access to e-mail and text-based Web pages. Introduced in 1997 by Phone.com (formerly Unwired Planet), Ericsson, Motorola and Nokia, WAP provides a complete environment for wireless applications that includes a wireless counterpart of TCP/IP and a framework for telephony integration such as call control and phone book access. WAP features the Wireless Markup Language (WML), which was derived from Phone.com's HDML and is a streamlined version of HTML for small screen displays. It also uses WMLScript, a compact JavaScript-like language that runs in limited memory. WAP also supports handheld input methods such as a keypad and voice recognition. Independent of the air interface, WAP runs over all the major wireless networks in place now and in the future. It is also device independent, requiring only a minimum functionality in the unit so that it can be used with a myriad of phones and handheld devices.

[4] An IN (Intelligent Network) service, Voice over IP (VoIP) service, e-mail service, paging service, etc., that provides call and/or message forwarding based on a time schedule.

[5] An IN (Intelligent Network) service, Voice over IP (VoIP) service, e-mail service, paging service, etc., that enables call and/or message forwarding to be initiated by the customer at any location. This service can also screen calls and/or message so that only certain calling telephone numbers and/or message will be forwarded.

What is claimed is:

1. A computer-implemented method for automatically providing personal information of a user, the method comprising:
   receiving a request for the personal information from a requestor that has been validated, wherein the requestor is different from the user;
   automatically selectively retrieving one of a plurality of questions supplied by the user, wherein the automatically selectively retrieved question is selected based on a type of the requestor, the type of requestor specifying a relationship with the user;
   receiving a response to the question from the requestor;
   automatically comparing the response to an answer supplied by the user, the answer corresponding to the question, wherein the response and the answer supplied by the user are content-based; and
   automatically selectively forwarding one or more portions of the personal information to the requestor based on a degree of match including a partial match between the response and the answer,
   wherein the user specifies the degree of match, and the degree of match relates to a selectable degree of accuracy of the content of the response as compared to the content of the answer supplied by the user,
   wherein the request, the response, and the specification of the degree of match are communicated through a user interface, and
   wherein the user interface comprises one or more fields for establishing, by the user, the questions and corresponding answers for access to the user's personal information based on the type of the requestor, the fields containing selections for specifying the degree of accuracy required for a response to a particular question as compared with the corresponding answer to the particular question that grant the access, the selections for specifying the degree of accuracy including an exact answer, a close answer, a part of the answer and anything.

2. The method of claim 1, wherein the personal information includes identification information of the user for establishing communication with the user.

3. The method of claim 1, wherein the personal information includes at least one of a title of said user, a gender of said user, name information of said user, a nickname of said user, address information of said user, a phone number of said user, a fax number of said user, a cellular phone number of said user, a pager number of said user, an e-mail address of said user, instant messaging information of said user, and a Web page address of said user.

4. The method of claim 1, wherein the relationship includes one of a casual contact of said user, a friend of said user, a family member of said user, a co-worker of said user, a business contact of said user, and a searcher.

5. The method of claim 1, wherein said question includes one of asking for an e-mail address of said user, asking for a pass code, asking for an extension of a phone number of said user and asking for a place of employment of said user.

6. The method of claim 1, further comprising integrating said method as part of one of a directory service, a programmatic interface for a system to authenticate users, a portal of related services, an online contacts management service, an online management of favorite Web links service, a schedule keeping service, a user's home page service, an information change notification service, an authentication and authorization service, an electronic business card service, a value-added service for other products, a call tree service, a follow-me service, and a find-me service.

7. The method of claim 1, further comprising automatically notifying said user whenever a requestor requests access to said personal information.

8. The method of claim 7, wherein said notifying step comprises notifying said user via at least one of an e-mail message, a facsimile message, a pager message, a phone message, and an instant message (IM).

9. The method of claim 1, wherein the question is among a plurality of questions corresponding to types of the requestor.

10. The method of claim 1, wherein the personal information is categorized for access according to type of the requestor.

11. The method of claim 1, further comprising:
   receiving an identifier associated with the user; and
   accessing the personal information associated with the user identifier to establish a communication session with the user according to content of the personal information.

12. A non-transitory computer-readable storage medium carrying one or more sequences of one or more instructions for providing personal information of a user, the one or more sequences of one or more instructions including instructions which, when executed by one or more processors, cause the one or more processors to perform the following steps:
   receiving a request for the personal information from a requestor that has been validated, wherein the requestor is different from the user;
   selectively retrieving one of a plurality of questions supplied by the user, wherein the selectively retrieved question is selected based on a type of the requestor, the type of requestor specifying a relationship with the user;
   receiving a response to the question from the requestor;
   comparing the response to an answer supplied by the user, the answer corresponding to the question, wherein the response and the answer supplied by the user are content-based;
   selectively forwarding one or more portions of the personal information to the requestor based on a degree of match including a partial match between the response and the answer,
   wherein the user specifies the degree of match, and the degree of match relates to a selectable degree of accuracy of the content of the response as compared to the content of the answer supplied by the user,
   wherein the request, the response, and the specification of the degree of match are communicated through a user interface, and
   wherein the user interface comprises one or more fields for establishing, by the user, the questions and corresponding answers for access to the user's personal information based on the type of the requestor, the fields containing selections for specifying the degree of accuracy required for a response to a particular question as compared with the corresponding answer to the particular question that grant the access, the selections for specifying the degree of accuracy including an exact answer, a close answer, a part of the answer and anything.

13. The non-transitory computer-readable storage medium of claim 12, wherein the personal information includes identification information of the user for establishing communication with the user.

14. The non-transitory computer-readable storage medium of claim 12, wherein the personal information includes at least one of a title of said user, a gender of said user, name information of said user, a nickname of said user, address information of said user, a phone number of said user, a fax number of said user, a cellular phone number of said user, a pager number of said user, an e-mail address of said user, instant messaging information of said user, and a Web page address of said user.

15. The non-transitory computer-readable storage medium of claim 12, wherein relationship includes one of a casual contact of said user, a friend of said user, a family member of said user, a co-worker of said user, a business contact of said user, and a searcher.

16. The non-transitory computer-readable storage medium of claim 12, wherein said question includes one of asking for an e-mail address of said user, asking for a pass code, asking for an extension of a phone number of said user and asking for a place of employment of said user.

17. The non-transitory computer-readable storage medium of claim 12, further causing the one or more processors to perform the step of integrating said computer-readable medium as part of one of a directory service, a programmatic interface for a system to authenticate users, a portal of related services, an online contacts management service, an online management of favorite Web links service, a schedule keeping service, a user's home page service, an information change notification service, an authentication and authorization service, an electronic business card service, a value-added service for other products, a call tree service, a follow-me service, and a find-me service.

18. The non-transitory computer-readable storage medium of claim 12, further causing the one or more processors to perform the step of notifying said user whenever a requestor requests access to said personal information.

19. The non-transitory computer-readable storage medium of claim 18, wherein said notifying step comprises notifying said user via at least one of an e-mail message, a facsimile message, a pager message, a phone message, and an instant message (IM).

20. A system configured to provide personal information of a user, the system comprising:
a database configured to store the personal information and a plurality of questions and respective corresponding answers, the questions and the respective corresponding answers being supplied by the user for controlling access to the stored personal information, wherein each question corresponds to a type of the requestor, the type of requestor specifying a relationship with the user, the requestor being different from the user;
a server configured to receive a request for the personal information from a client that has been validated, wherein the server is further configured to selectively retrieve one of the questions from the database and to receive a response to the question from the client, the server comparing the response to the answers and selectively providing access to one or more portions of the personal information based on a degree of match including a partial match with the answer, wherein the selectively retrieved question is selected based on the type of the requestor and wherein the response and the answer supplied by the user are content-based;
wherein the user specifies the degree of match, and the degree of match relates to a selectable degree of accuracy of the content of the response as compared to the content of the answer stored in the database,
wherein the request, the response, and the specification of the degree of match are communicated through a user interface, and
wherein the user interface comprises one or more fields for establishing, by the user, the questions and corresponding answers for access to the user's personal information based on the type of the requestor, the fields containing selections for specifying the degree of accuracy required for a response to a particular question as compared with the corresponding answer to the particular question that grant the access, the selections for specifying the degree of accuracy including an exact answer, a close answer, a part of the answer and anything.

21. The system of claim 20, wherein the personal information includes user identification for establishing communication with the user.

22. The system of claim 20, wherein the personal information comprises at least one of a title of said user, a gender of said user, name information of said user, a nickname of said user, address information of said user, a phone number of said user, a fax number of said user, a cellular phone number of said user, a pager number of said user, an e-mail address of said user, instant messaging information of said user, and a Web page address of said user.

23. The system of claim 20, wherein the relationship includes one of a casual contact of said user, a friend of said user, a family member of said user, a co-worker of said user, a business contact of said user, and a searcher.

24. The system of claim 20, wherein said question comprises one of asking for an e-mail address of said user, asking for a pass code, asking for an extension of a phone number of said user and asking for a place of employment of said user.

25. The system of claim 20, further comprising integrating said system as part of one of a directory service, a programmatic interface for a system to authenticate users, a portal of related services, an online contacts management service, an online management of favorite Web links service, a schedule keeping service, a user's home page service, an information change notification service, an authentication and authorization service, an electronic business card service, a value-added service for other products, a call tree service, a follow-me service, and a find-me service.

26. The system of claim 20, wherein said server is further configured to notify said user whenever a requestor requests access to said personal information.

27. The system of claim 26, wherein the notification comprises at least one of an e-mail message, a facsimile message, a pager message, a phone message, and an instant message (IM).

28. A method for supporting access of personal information of a user, the method comprising:
generating, by the user, a plurality of questions and associated respective answers for controlling access to the personal information, wherein each of the plurality of questions is associated with a type of a requestor, the type of requestor specifying a relationship with the user, the requestor being different from the user; and
transmitting the plurality of questions, associated respective answers, and an indication of the type of requestor for each question for storage at a remote database,
wherein one of the questions is selectively retrieved from the remote database and presented to a requestor that has been validated upon the requestor submitting a request to access the personal information, the requestor outputting a response to the question, wherein the response is compared with the stored respective answer, the requestor being permitted to access one or more portions of the personal information according to a degree of matching including a partial match with the answer, wherein the selectively retrieved question is selected based on the type of the requestor and wherein the response and the answer supplied by the user are content-based, wherein the user specifies the degree of match, and the degree of match relates to a selectable degree of accuracy of the content of the response as compared to the content of the stored respective answer, wherein the request, the response, and the specification of the degree of match are communicated through a user interface, and wherein the user interface comprises one or more fields for establishing, by the user, the questions and corresponding answers for access to the user's personal information based on the type of the requestor, the fields containing selections for specifying the degree of accuracy required for a response to a particular question as compared with the corresponding answer to the particular question that grant the access, the selections for specifying the degree of accuracy including an exact answer, a close answer, a part of the answer and anything.

29. A method for accessing information of a user, the method comprising:

validating a requestor of the user information, wherein the requestor is different from the user;

determining type of the requestor;

prompting the requestor with one of a plurality of questions that are supplied by the user, wherein the one question is selected among the plurality of questions based on the type of the requestor;

receiving a response to the one question from the requestor, wherein the response and the answer supplied by the user are content-based; and forwarding a portion of the user information to the requestor based on a qualitative degree of match including a partial match between the response and a predetermined answer provided by the user, wherein the user specifies the degree of match, and the degree of match relates to a selectable degree of accuracy of the content of the response as compared to the content of the predetermined answer, wherein the request, the response, and the specification of the degree of match are communicated through a user interface, and wherein the user interface comprises one or more fields for establishing, by the user, the questions and corresponding answers for access to the user's personal information based on the type of the requestor, the fields containing selections for specifying the degree of accuracy required for a response to a particular question as compared with the corresponding answer to the particular question that grant the access, the selections for specifying the degree of accuracy including an exact answer, a close answer, a part of the answer and anything.

\* \* \* \* \*